United States Patent [19]

Brogard

[11] 4,417,644
[45] Nov. 29, 1983

[54] ANTI-THEFT DEVICE AND METHOD FOR DETERRING THEFT OF MOBILE EQUIPMENT

[76] Inventor: Paul D. Brogard, 3425 E. Mt. Ebal Rd., Bloomington, Ind. 47401

[21] Appl. No.: 273,853

[22] Filed: Jun. 15, 1981

[51] Int. Cl.³ .......................................... B60R 25/04
[52] U.S. Cl. .................................... 180/287; 70/423; 212/189; 280/764.1
[58] Field of Search ............... 280/763.1, 764.1, 765.1, 280/766.1; 188/67; 298/17 B, 22 R; 180/287; 92/15, 23; 70/18, 423; 212/189

[56] References Cited

U.S. PATENT DOCUMENTS

| | | | |
|---|---|---|---|
| 1,384,590 | 7/1921 | Bottone | 70/18 |
| 1,800,943 | 4/1931 | Junkunc | 70/18 X |
| 2,397,516 | 4/1946 | Stewart | 188/67 |
| 3,135,555 | 6/1964 | Caskey | 92/23 X |
| 3,430,735 | 3/1969 | Collins | 188/67 |
| 3,898,824 | 8/1975 | Borlinghaus | 70/423 X |
| 4,122,758 | 10/1978 | Bieringer et al. | 298/17 B X |
| 4,325,238 | 4/1982 | Scherbing | 70/18 |
| 4,360,074 | 11/1982 | Parquet | 180/287 |
| 4,373,851 | 2/1983 | Confoey | 414/722 |

FOREIGN PATENT DOCUMENTS 898521 6/1962 United Kingdom .................. 92/23

Primary Examiner—Joseph F. Peters, Jr.
Assistant Examiner—Michael Mar
Attorney, Agent, or Firm—Woodard, Weikart, Emhardt & Naughton

[57] ABSTRACT

Devices and methods for protecting against the theft of mobile equipment having at least one hydraulic cylinder (telescoping support member) that is extendable to a equipment immobilizing position, in which position the equipment is rendered immobile. A hollow strut which is dimensioned to receive the shaft of such a hydraulic cylinder and has sufficient length to maintain the hydraulic cylinder in its equipment immobilizing position, thereby maintaining the heavy equipment in its immobile state. The strut has two halves hinged to each other and is mountable about the shaft and lockable thereabout with an anti-theft locking mechanism. The anti-theft locking mechanism is concealed when the strut is maintaining the hydraulic cylinder in its equipment immobilizing position.

23 Claims, 7 Drawing Figures

ANTI-THEFT DEVICE AND METHOD FOR DETERRING THEFT OF MOBILE EQUIPMENT

BACKGROUND OF THE INVENTION

1. Field of the Invention

The field of the invention relates to locking devices and methods, more particularly the field of the invention relates to protecting against the theft of heavy construction equipment, mobile farm equipment and the like.

2. Brief Description of the Prior Art

A wide variety of mobile apparatus is used in the construction and farming industries. Such equipment is used in the moving and removing of earth, in the lifting and transporting of heavy materials, etc. The apparatus normally incorporates hydraulic cylinders which are power operated to move between positions of various extension, causing the tool equipment and the apparatus to perform its work functions. Hydraulic cylinders are also used to position temporary supports which improve the stability of the equipment during work operations.

It has been recognized that hydraulic cylinders can be immobilized by placing safety devices along the shaft of the cylinder. U.S. Pat. No. 3,135,555 to MeCaskey discloses a safety guard for the ram of an hydraulic hoist. In this patent there is disclosed the use of the safety guard to maintain the bed of a dump truck in a raised position. Similarly, U.S. Pat. No. 2,397,516 discloses a safety locking device that is adapted to lock a piston rod in a position to prevent accidental closure of bomb bay doors on workmen. U.S. Pat. No. 4,122,758 discloses a U-shaped support member to straddle the rod of a lift cylinder of a loader-type vehicle. Another such device for use with the brake assembly of railroad cars is disclosed in U.S. Pat. No. 3,430,735. Devices of this type serve their safety function quite well, but they do not serve the function of preventing theft, since they are readily removable. Moreover, many of the examples of use would not significantly affect the theft of the vehicle they are used on.

Theft of such mobile equipment is a problem of major proportions. Because of the equipment's inherent mobility, it is very susceptible to theft. When left unattended, the vehicle can easily be jump started and driven away. Even when attended, the vehicles are often not substantially protected against theft. Various pieces of equipment are often spread out over large areas. As a result, security is often inadequate to protect against unauthorized trespass. It is not unusual for a vehicle to be driven away (or onto a trailer) before the unauthorized trespass is detected.

SUMMARY OF THE INVENTION

In general terms, the invention relates to devices and methods for protecting against the theft of mobile equipment. Such equipment includes at least one hydraulic cylinder (telescoping support member) that is extendable to a position in which the equipment is rendered effectively immobile, such as in a weight-supporting or vehicle-turning position. A hollow strut is dimensioned to receive the shaft of such a hydraulic cylinder and has sufficient length to maintain the hydraulic cylinder in its equipment immobilizing position. The strut is mountable about the shaft and lockable thereabout with an anti-theft locking mechanism. In certain embodiments, the anti-theft locking mechanism is concealed when the strut is maintaining the hydraulic cylinder in its equipment immobilizing position. The objects and advantages of the present invention will become further apparent from the reading of the following specification.

DESCRIPTION OF THE PREFERRED EMBODIMENT

Figure 1:
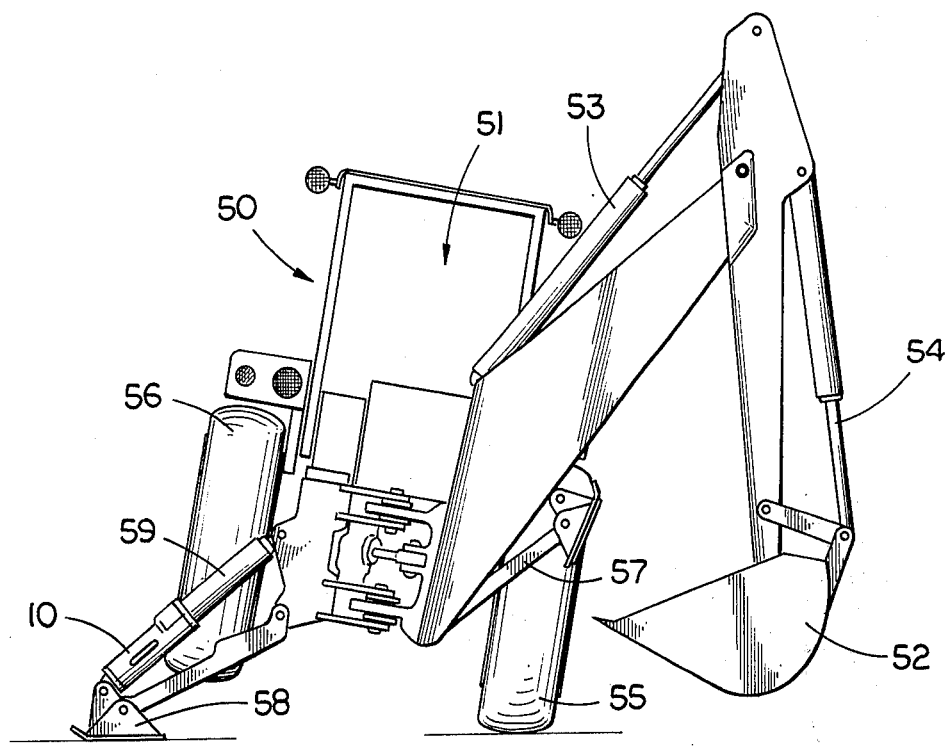
FIG. 1 is a side elevational view of a piece of mobile equipment being maintained in an immobile state by anti-theft device 10 in a longitudinally compressed state.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 illustrates a piece of heavy mobile equipment 50 which is being maintained in an immobile state by anti-theft device 10. Mobile equipment 50 is a mobile earth shoveler, and includes an earth shovel 52 which is controllably operated by hydraulic cylinders 53 and 54. An operator can control the work function of earth shovel 52 from cabin 51. In cabin 51 an operator may also control the steering of the front wheels and the application of power to the rear wheels 55 and 56 of the mobile equipment 50. To improve stability during certain work functions, equipment 50 includes temporary support legs 57 and 58. Support legs 57 and 58 are moveable into weight supporting positions, whereby equipment 50 is stabilized and made immobile during work functions. In FIG. 1, temporary support leg 57 is in its retracted position, in which it is not in a weight supporting position. Support leg 58 is extended to a weight supporting position by extended hydraulic cylinder 59. Anti-theft device 10 is shown mounted to the shaft of hydraulic cylinder 59 in a longitudinally compressed state, thus maintaining support leg 58 in a load bearing condition to render equipment 50 immobile.

Figure 2:
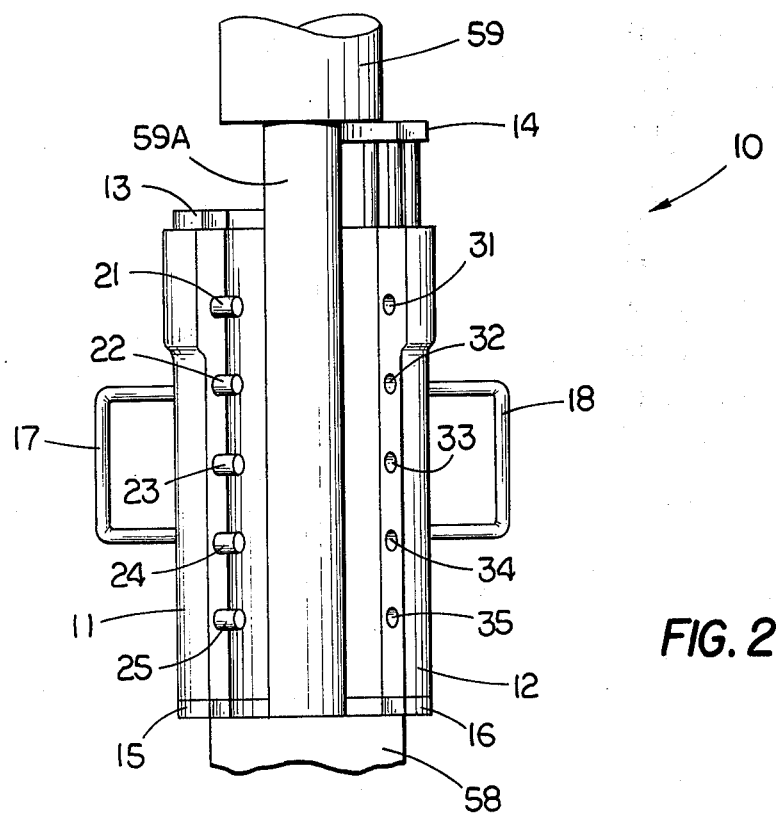
FIG. 2 is a fragmentary view of the hydraulic cylinder and support leg of the mobile equipment of FIG. 1, with anti-theft device 10 in an uncompressed state and in a position to be placed about the shaft of the cylinder.
Figure 6:
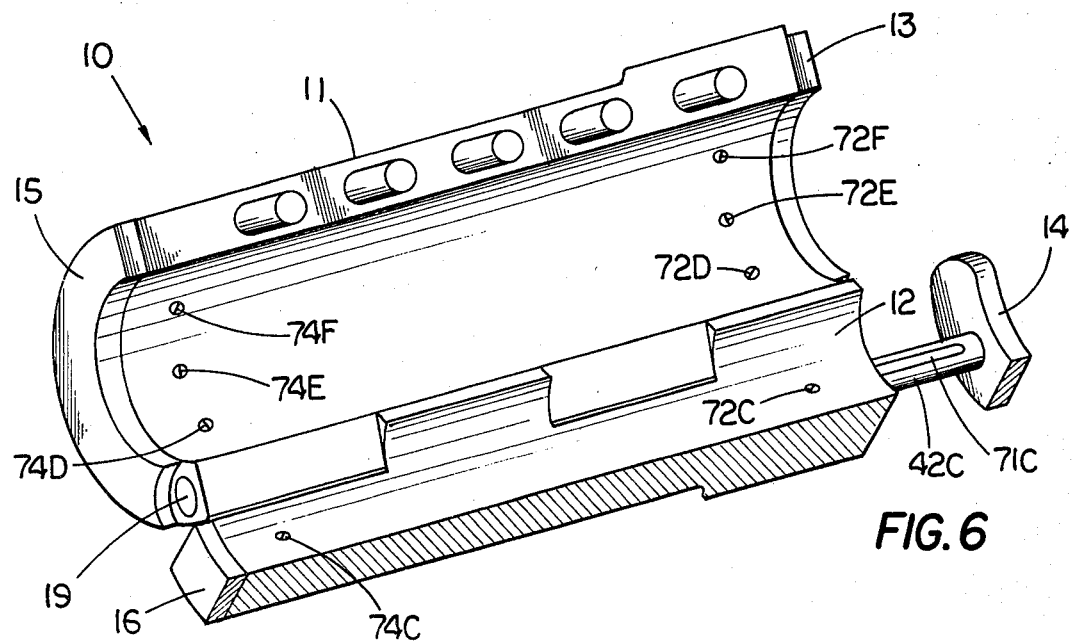
FIG. 6 is a prospective view of anti-theft device 10 of FIG. 2, illustrating the hinged attachment of the two substantially half-tube members.

In FIG. 2, anti-theft device 10 is in an uncompressed state in a position to be placed about shaft 59A of hydraulic cylinder 59. Anti-theft device 10 includes a hollow strut of two substantially half tube members 11 and 12 whose bodies are made of cast aluminum. Half tube members 11 and 12 are hingeably attached to each other along one longitudinal joining line (see FIG. 6) and are latchably attached to each other along the opposite joining line. Half tube member 11 has a series of longitudinally spaced locking posts which extend tangentially from member 11. Half tube member 12 has a series of reciprocal longitudinally spaced bores, bores 31, 32, 33, 34, and 35, which are spaced and dimensioned to receive locking posts 21, 22, 23, 24, and 25. Handles 17 and 18 are attached to half tube members 11 and 12 respectively. Additionally, substantially half ring stainless steel plates 13, 14, 15, and 16 are attached to the end portions of half tube members 11 and 12. These half ring plates are removeable and may be replaced with other rings having a different inside diameter, so that the assembly could be used with other hydraulic cylinders having different shaft sizes.

Figure 3:
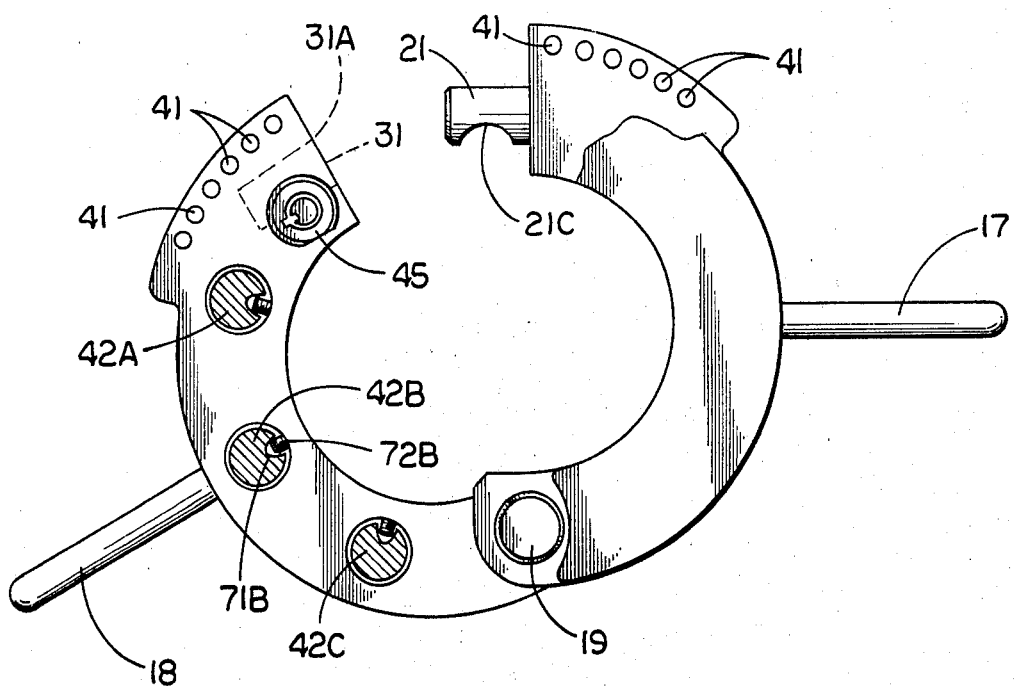
FIG. 3 is a top plan, partially fragmented view of anti-theft device 10, sectioned along plane A—A of FIG. 4.

In FIG. 3, it can be seen that half tube members 11 and 12 are hingeably attached to each other by longitudinal stainless steel pin 19. Anti-theft locking mechanism 45, of conventional plug lock design (circular tumbler design), is also visible in FIG. 3, and is key operated between locked and unlocked conditions. Alternatively, a combination lock or an in-line tumbler lock, etc. may be used in place of the circular tumbler design shown. Steel shield means include a plurality of longitudinally oriented stainless steel pins 41 archically spaced about anti-theft locking mechanism 45. In place of the stainless steel, hardened steel could be substituted. Steel pins 41 help to prevent a thief from obtaining access to anti-theft locking mechanism 45 by drilling through the aluminum casing.

Figure 4:
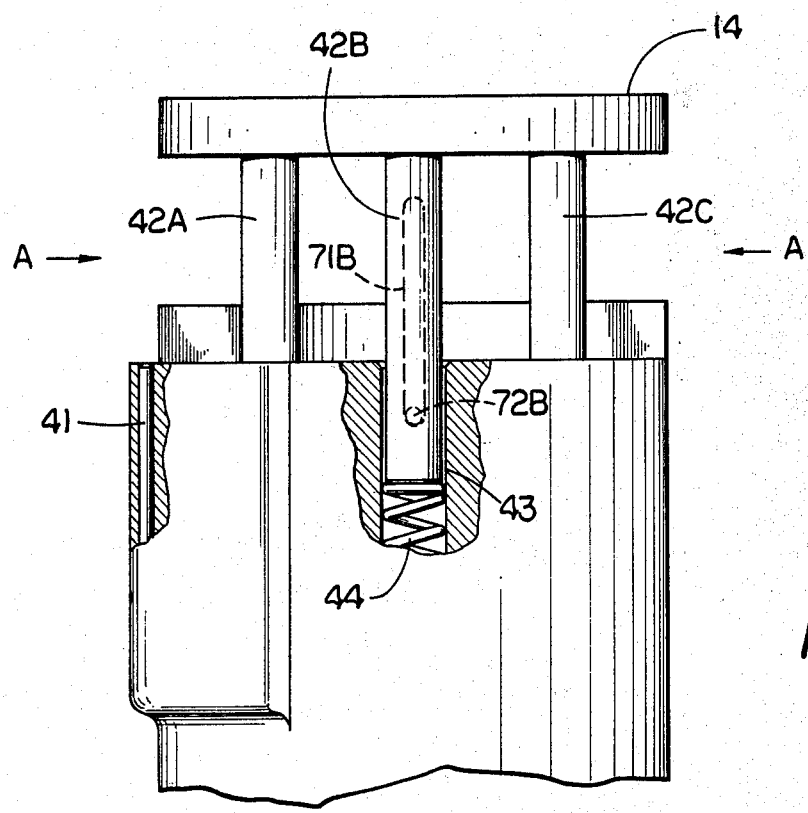
FIG. 4. is a fragmentary, side elevational view of anti-theft device 10 of FIG. 2.

In FIG. 4, it can been seen that stainless steel plate 14, which covers the anti-theft locking mechanism 45, is spring biased to an open position, whereby anti-theft locking mechanism 45 is exposed when anti-theft device 10 is not in a compressed, weight maintaining position. Steel plate 14 has three stainless steel shafts 42A, 42B, and 42C which are slideably positioned in holes such as hole 43 which contains spring 44. Retaining pins, such as pin 72B, are positioned in grooves, such as groove 71B, to limit the outward travel of the shafts 42A-C.

Figure 5A:
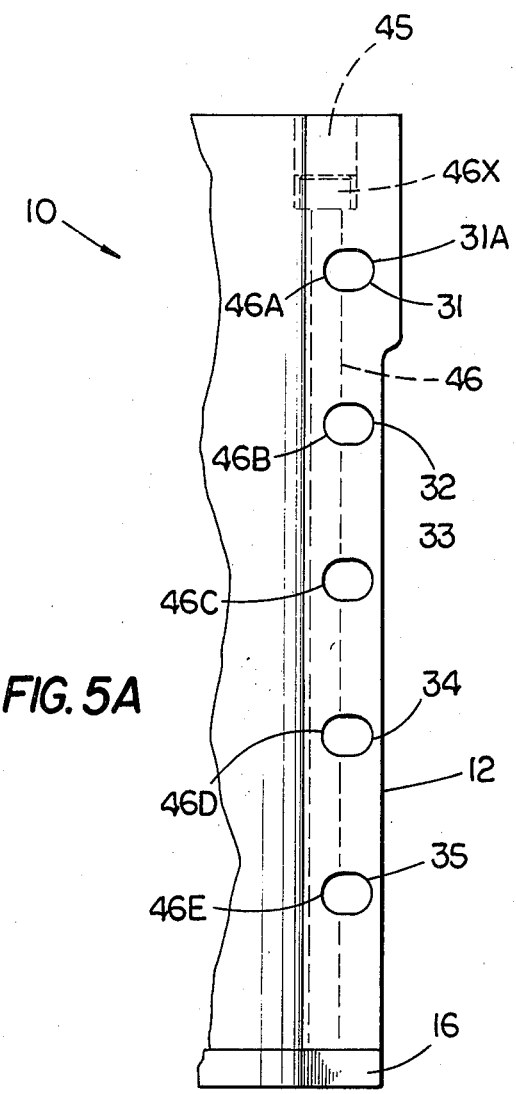
FIGS. 5A and 5B display a fragmentary view of anti-theft device 10 of FIG. 2, with the device being in an unlocked condition (FIG. 5A) and in a locked condition (FIG. 5B).
Figure 5B:
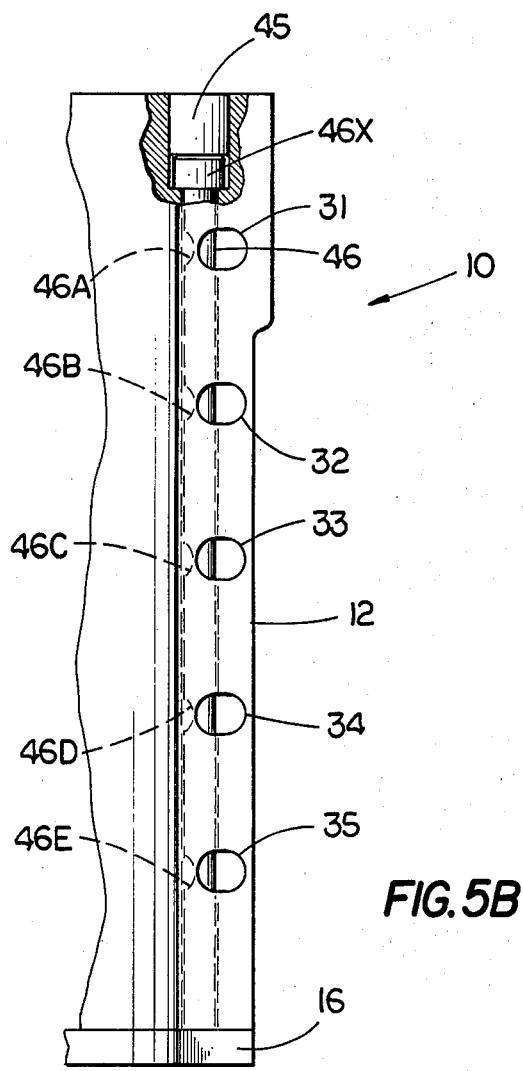

FIGS. 5A and 5B illustrate the manner in which anti-theft locking mechanism 45 selectively locks and unlocks the anti-theft device 10. Longitudinal rod 46 has a head 46X with a hexagonal recess into which a conventional hexagonal tool (such as an Allen wrench) may be inserted to rotate the rod with substantial torque. Access to end 46X of longitudinal rod 46 is controlled by anti-theft locking device 45. Rod 46 is positionable between: (1) a locked position (FIG. 5B) in which rod 46 intersects with longitudinally spaced bores 31, 32, 33, 34, and 35, thereby preventing removal of locking posts 21, 22, 23, 24 and 25 respectively, and (2) an unlocked condition (FIG. 5A) in which groved portions 46A, 46B, 46C, 46D, and 46E are rotated in the position wherein rod 46 does not interesect with bores 31, 32, 33, 34, and 35, whereby bores 31-35 can receive locking posts 21-25 respectively. In the same fashion that plate 14 has rods 42A-C, plates 13 15 and 16 have rods (not shown) extending into corresponding holes. However, these rods do not have the springs nor grooves associated with them. The set screw slot end of pin 72C is shown and is representative of the corresponding pins 72B and 72A (not shown). Set screws 72D-F and 74A-F are used to hold the rods from plates 13, 15 and 16. If desired, the plates may be modified to include rubber surfaces abutting the cylinder rod to minimize the chance of damage to the polished surface of the rod.

As an example of use, the support leg 58 of heavy mobile equipment 50 is extended to lift wheel 56 substantially above the ground. With the wheel 56 off of the gound, the propelling means of the mobile equipment is rendered inoperable. The extended shaft 59A of hydraulic cylinder 59 is placed in a weight supporting position bearing a portion of the weight of the equipment. Anti-theft device 10 in an uncompressed state, is mounted about shaft 59A and the anti-theft locking mechanism 45 is operated with a key (not shown) to latch mechanism 45 in a closed position. The hydraulic cylinder 59 is then released to compress against the anti-theft device 10. This not only conceals the anti-theft locking mechanism 45 beneath a load bearing surface of the strut, but also maintains the support leg 58 in a load bearing condition in view of the length of the anti-theft device 10.

While the invention is described in connection with the extension of a strut of mobile equipment, it is equally applicable to the extension of any other member of a piece of mobile equipment which would render the equipment immobile. This would include weight bearing implements of mobile equipment, for example, the blades of a road grader, the bucket of a backhoe, the front blade of a bulldozer, etc. Similarly, it would include other means of immobilization by preventing operation of steering cylinders on articulating machines or hydraulic assisted steering cylinders on power steering devices. Equipment which had its steering restricted to prevent driving straight ahead would would be effectively rendered immobile.

While there have been described above, the principles of this invention in connection with specific apparatus and techniques, it is to be clearly understood that this description is made only by way of an example and not as a limitation to the scope of the invention.

What is claimed is:

1. An anti-theft device for mobile equipment, the mobile equipment including propelling means for moving the equipment about, the equipment further including at least one telescoping support member extensible to a position in which the telescoping support member renders the equipment immobile, the telescoping support member including a cylinder and a shaft extensible therefrom, said device comprising:

(a) a hollow strut, said strut having an external longitudinal surface and having a cavity along its length which is dimensioned to receive the shaft of the telescoping support member, said strut being of sufficient length to maintain the telescoping support member in said equipment immobilizing position;

(b) mounting means for mounting said strut lengthwise about the shaft, said means including means for creating an open condition in which there is a full length passageway between said longitudinal external surface and said cavity, said passageway being adapted to receive the shaft through said passageway and into said cavity, and means for creating a closed condition in which the shaft is completely enclosed by said strut;

(c) anti-theft locking means for locking said strut in said closed condition about the shaft, said locking means including an anti-theft locking mechanism;

(d) lock concealment means for concealing said anti-theft locking mechanism whenever said strut is engaged with the retracted cylinder and shaft.

2. The anti-theft device of claim 1 in which the exposed surface of said lock concealment means includes said anti-theft locking mechanism being located at a surface of said strut that is equipment immobilizing when said strut is maintaining the telescoping support member in said equipment immobilizing position.

3. The anti-theft device of claim 1 in which said anti-theft locking mechanism is located at a transverse facing between said external longitudinal surface and said cavity.

4. The anti-theft device of claim 1 in which said anti-theft locking mechanism is located at an end surface of said strut.

5. The anti-theft device of claim 1 in which said lock concealment means is spring loaded to reveal said anti-theft locking mechanism when said strut is not maintaining the telescoping member in said equipment immobilizing position.

6. An anti-theft device for mobile equipment, the mobile equipment including propelling means for moving the equipment about, the equipment further including at least one telescoping support member extensible to a position in which the telescoping support member renders the equipment immobile, the telescoping support member including a cylinder and a shaft extensible therefrom, said device comprising;
(a) a hollow strut, said hollow strut being mountable lengthwise about the shaft and including two substantially half-tube members hingably attached to each other long one longitudinal joining line;
(b) means for latchably attaching said half-tube members to each other along the opposite longitudinal joining line, said means for latchably attaching including means near said opposite longitudinal joining line for coupling the two halves together near the central portion of the longitudinal joining line as well as near each of the two ends; and
(c) anti-theft locking means including an anti-theft locking mechanism, said anti-theft locking means being for locking said strut in a closed condition about the shaft, said locking means adapted so that said single locking mechanism affects the unlocking of said means for latchably attaching near the central portion of the longitudinal joining line as well as near each of the two ends and so that the means for latchably attaching can not be unlatched when the shaft is retracted and the strut is in a load bearing condition.

7. The anti-theft device of claim 6 in which said two substantially half-tube members are aluminum.

8. The anti-theft device of claim 7 additionally including steel shield means implanted within said hollow strut between said anti-theft locking mechanism and said external longitudinal surface.

9. The anti-theft device of claim 8 in which said steel shield means includes a plurality of longitudinally oriented steel pins arcially spaced about said anti-theft locking mechanism.

10. The anti-theft device of claim 7 in which the ends of said substantially half-tube members are covered by four substantially half-ring steel plates.

11. The anti-theft device of claim 10 in which one of said steel plates covers said anti-theft locking mechanism, said plate being extensible to a position in which said anti-theft locking mechanism is operably accessible.

12. The anti-theft device of claim 11 in which said steel plate covering said locking mechanism is mounted to one of said substantially half-tube members by longitudinal steel locking posts extending into longitudinal bores in said substantially half-tube member, said locking posts being spring biased to said extended position in which said anti-theft locking mechanism is operably accessible.

13. The anti-theft device of claim 6 additionally comprising handle means for aiding in mounting and dismounting.

14. The anti-theft device of claim 13 in which said handle means includes one handle on each of the two substantially half-tube members.

15. The anti-theft device of claim 6 and further comprising:
lock concealment means for concealing said anti-theft locking mechanism when said strut is maintaining the telescoping support member in said equipment immobilizing position.

16. The anti-theft device of claim 6 in which said means for latchably attaching includes several latches which simultaneously either lock or unlock in response to the operation of said locking mechanism.

17. The anti-theft device of claim 16 wherein:
(a) said latches include
(1) a series of longitudinally spaced locking posts in one of said substantially half-tube members which extend tangentially from said opposite joining line, and
(2) a series of longitudinally spaced bores in the other of said substantially half-tube members along said opposite joining line, said bores being spaced and dimensioned to receive said locking posts when said strut is in said closed condition; and
(b) said anti-theft locking means further includes means for selectively preventing the removal of said locking posts from said bores, said selective removal preventing means including a longitudinal rod implanted within said other substantially half-tube member, said rod being controllable by said anti-theft locking mechanism between an unlocked position in which said rod does not intersect with said bores and a locked position in which said rod does intersect with said bores, said locking posts having cavities to receive said rod in said locked condition.

18. The anti-theft device of claim 17 in which the relative movement of said rod between said unlocked position and said locked position is rotational.

19. A method for deterring theft of mobile equipment, the mobile equipment including propelling means for moving the equipment about and at least one telescoping support member including a cylinder and a shaft extensible therefrom and a strut surrounding the shaft and containing an anti-theft locking mechanism and means for concealing the anti-theft locking mechanism whenever the extended telescoping support member is released to place the strut in a load bearing condition, said method comprising the steps of:
(a) extending the telescoping support member to an equipment immobilizing position in which the telescoping support member is bearing a portion of the weight of the equipment to render the propelling means inoperable;
(b) maintaining the telescoping support member in its equipment immobilizing position by placing a hollow strut about the shaft of the telescoping support member;

(c) locking the hollow strut about the shaft of the telescoping support member with an anti-theft locking mechanism; and (d) after said locking, concealing the anti-theft locking mechanism by releasing the extended telescoping support member to place the strut in a load bearing condition.

20. An anti-theft device for mobile equipment, the mobile equipment including propelling means for moving the equipment about, the equipment further including at least one telescoping support member extensible to a position in which the telescoping support member renders the equipment immobile, the telescoping support member including a cylinder and a shaft extensible therefrom, said device comprising:

(a) a hollow strut, said strut having an external longitudinal surface and having a cavity along its length which is dimensioned to receive the shaft of the telescoping support member, said strut being of sufficient length to maintain the telescoping support member in said equipment immobilizing position;

(b) mounting means for mounting said strut lengthwise about the shaft, said means including means for creating an open condition in which there is a full length passageway between said longitudinal external surface and said cavity, said passageway being adapted to receive the shaft through said passageway and into said cavity, and means for creating a closed condition in which the shaft is completely enclosed by said strut;

(c) anti-theft locking means for locking said strut in said closed condition about the shaft, said locking means including an anti-theft locking mechanism; and (d) a shield and means for positioning said shield to prevent access to said anti-theft locking means when the telescoping support member is released with the strut mounted about the shaft.

21. The anti-theft device of claim 20 in which said shield is a plate and said means for positioning includes a plurality of steel pins connecting between said plate and said hollow strut.

22. An anti-theft device for mobile equipment, the mobile equipment including propelling means for moving the equipment about, the equipment further including at least one telescoping support member extensible to a position in which the telescoping support member renders the equipment immobile, the telescoping support member including a cylinder and a shaft extensible therefrom, said device comprising:

(a) a hollow strut, said strut having a central cavity along its length which is dimensioned to receive the shaft of the telescoping support member, said strut being of sufficient length to maintain the telescoping support member in said equipment immobilizing position;

(b) mounting means for mounting said strut lengthwise about the shaft, said means including means for creating an open condition in which there is a full length passageway between said longitudinal external surface and said cavity, said passageway being adapted to receive the shaft through said passageway and into said cavity, and means for creating a closed condition in which the shaft is completely enclosed by said strut; and (c) anti-theft locking means for latching and locking said strut in said closed condition about the shaft, said locking means including an anti-theft locking mechanism; said locking means having means to prevent the unlatching of said strut when the shaft is retracted and the strut is in a load bearing condition.

23. The anti-theft device of claim 22 in which said hollow strut has an external generally cylindrical longitudinal surface and in which said anti-theft locking means is located essentially entirely within the cylinder of the surface of said strut.

* * * * *